(12) United States Patent
Karnad et al.

(10) Patent No.: US 9,002,665 B2
(45) Date of Patent: Apr. 7, 2015

(54) MULTI-CHANNEL FLOW SENSING

(71) Applicant: Texas Instruments, Incorporated, Dallas, TX (US)

(72) Inventors: Ravindra Karnad, Bangalore (IN); Venkata Ramanan Ramamurthy, Bangalore (IN); Anand Dabak, Plano, TX (US); Venu Gopinathan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 191 days.

(21) Appl. No.: 13/895,269

(22) Filed: May 15, 2013

(65) Prior Publication Data

US 2014/0338467 A1 Nov. 20, 2014

(51) Int. Cl.
G01F 7/00 (2006.01)
G01F 1/66 (2006.01)

(52) U.S. Cl.
CPC . G01F 1/66 (2013.01); G01F 1/663 (2013.01)

(58) Field of Classification Search
USPC .............................. 702/48, 50, 42
See application file for complete search history.

(56) References Cited

U.S. PATENT DOCUMENTS

| 7,039,529 | B2 | 5/2006 | Keech | |
|---|---|---|---|---|
| 7,117,104 | B2* | 10/2006 | Urdaneta et al. | 702/48 |
| 7,213,468 | B2* | 5/2007 | Fujimoto | 73/861.27 |
| 8,234,933 | B2* | 8/2012 | Fukuhara et al. | 73/861.25 |
| 2013/0080081 | A1 | 3/2013 | Dugger et al. | |
| 2014/0012518 | A1* | 1/2014 | Ramamurthy et al. | 702/48 |

FOREIGN PATENT DOCUMENTS

CN 202886400 U 4/2013

* cited by examiner

Primary Examiner — Jewel V Thompson
(74) Attorney, Agent, or Firm — John R. Pessetto; Frank D. Cimino

(57) ABSTRACT

A multi-channel flow sensing system typically includes first and second flow-sensing transducers arranged in each channel. A data acquisition system is coupled to the first and second transducers of each of the channels. The data acquisition system is arranged to transmit and/or receive a sensing signal from at least one of the first and second transducers of each of the channels. The received sensing signals are sequentially converted and accumulated as data for billing in accordance with the measured flow within each channel. Using common components within the data acquisition system for measuring the various channels reduces costs and increases affordability in cost-sensitive areas.

20 Claims, 6 Drawing Sheets

MULTI-CHANNEL FLOW SENSING

BACKGROUND

The cost of providing basic utilities—such as water for household needs—typically increases in response to a greater demand for the natural resources resulting from greater human population densities. In cost-sensitive residential areas for example, the infrastructure used to deliver the utilities is often installed and/or updated on an as-needed (and/or an when-affordable) basis in order to meet continuing increases in demand. As the costs increase, metering (and associated billing) of the utilities is used to help discourage excess consumption and more fairly apportion costs (for example, in accordance with the usage of each consumer). Because many of the updates are performed within varying dwelling structures that have not necessarily been designed to accommodate "retrofitting" of systems, the upgrade costs required vary considerably and often can exceed affordable pricing in cost-sensitive areas.

SUMMARY

The problems noted above can be solved in large part by a multi-channel flow sensing system that, for example, provides a cost-effective solution for measuring water flow in one or more channels. The sensing system includes first and second flow-sensing transducers arranged in each channel. A data acquisition system is coupled to the first and second transducers of each of the channels. The data acquisition system is arranged to transmit and/or receive a sensing signal from at least one of the first and second transducers of each of the channels. The received sensing signals are sequentially converted and accumulated as data for billing in accordance with the measured flow within each channel. Using common components within the data acquisition system for measuring the various channels reduces costs and increases affordability in cost-sensitive areas.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections.

Figure 1:
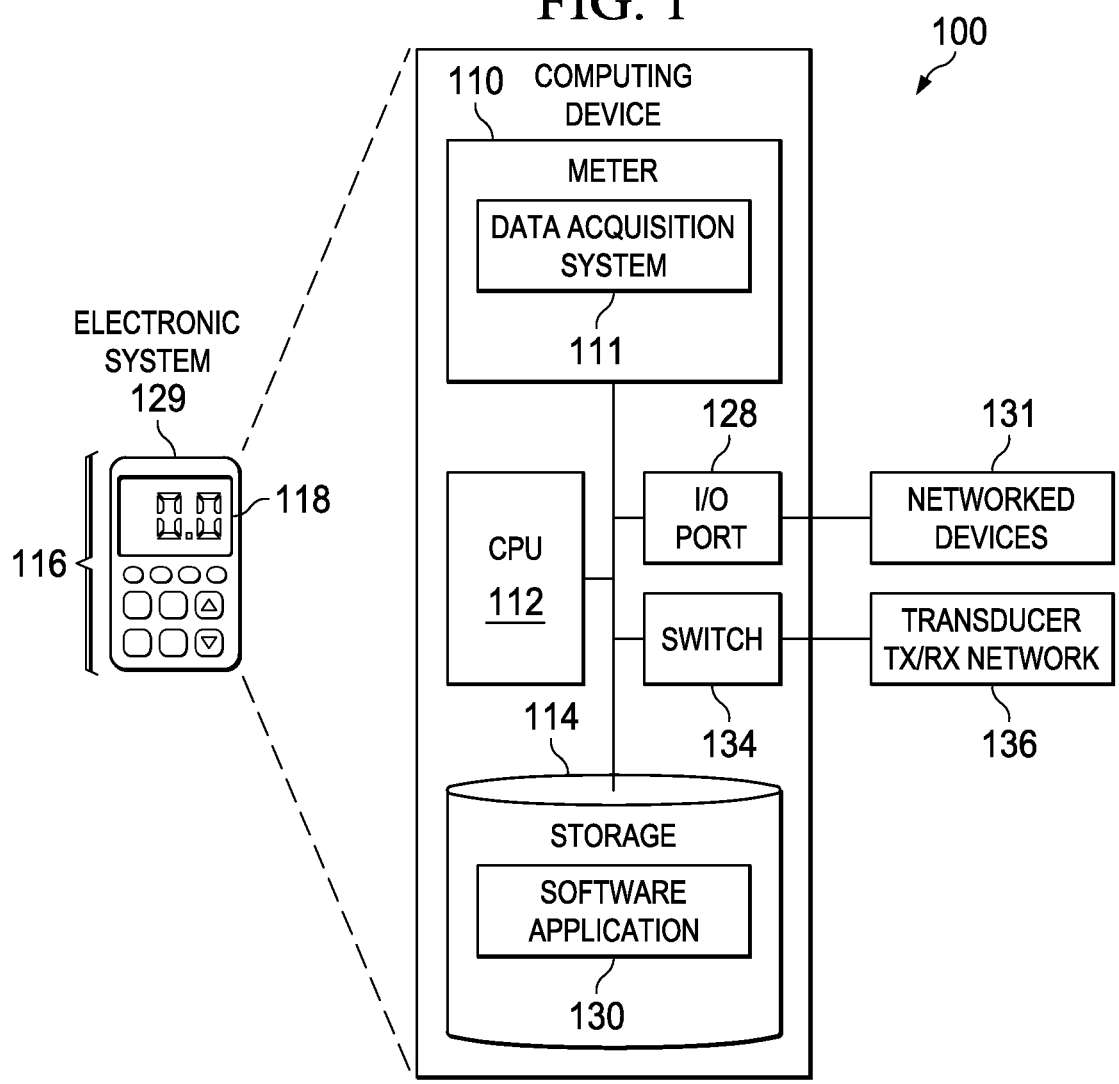
FIG. 1 shows an illustrative electronic device in accordance with example embodiments of the disclosure.

FIG. 1 shows an illustrative computing device 100 in accordance with preferred embodiments of the disclosure. For example, the computing device 100 is, or is incorporated into, an electronic system 129, such as a mobile device, a personal digital assistant, a personal computer, electronics control "box" or display, utility meter, or any other type of electronic system. The computing device 100 can be power from line current and/or battery storage.

In some embodiments, the computing device 100 comprises a megacell or a system-on-chip (SoC) which includes control logic such as a CPU 112 (Central Processing Unit), a storage 114 (e.g., random access memory (RAM)) and meter 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 (which can be memory such as on-processor cache, off-processor cache, RAM, flash memory, or disk storage) stores one or more software applications 130 (e.g., embedded applications) that, when executed by the CPU 112, perform any suitable function associated with the computing device 100.

The meter 110 is monitoring system and comprises logic (embodied at least partially in hardware) that supports monitoring, testing, and debugging of the computing device 100 executing the software application 130. For example, the meter 110 can emulate one or more defective or unavailable components of the meter 110 to allow verification of how the component(s), were it actually functional on the computing device 100, would perform in various situations (e.g., how the components would interact with the software application 130). In this way, the meter 110 can be debugged in an environment which resembles post-production operation.

The meter 110 includes a data acquisition system 111 that is used, for example, to measure fluid flow in conduits (e.g., piping or tubing) from water mains. As discussed further below with respect to the accompanying figures, the incorporated measurement circuitry can lessen an amount and cost associated with (e.g., external) measurement equipment that would otherwise be required to measure fluid flow in channels of respective individual pipes (each of which is typically associated with an individual entity). For example, a single data acquisition system 111 can be used to sequentially sample fluid flow (e.g., for example in separate pipes) at defined intervals and to store the measurements for various channels in data storage 114. Billing amounts for individual entities can be generated and presented to an off-device billing agency (such as a public utility). Accordingly, the data acquisition system 111 typically includes functionality for recording fluid flow for individual channels over various billing periods.

The CPU 112 comprises memory and logic that store information frequently accessed from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and mechanical devices such as keypads, switches, proximity detectors, and the like. The CPU 112 and meter 110 is coupled to I/O (Input-Output) port 128, which provides an interface that is configured to receive input from (and/or provide output to) peripherals and/or computing devices 131, including tangible media (such as flash memory) and/or cabled or wireless media (including internet protocol over power lines). These and other input and output devices are selectively coupled to the computing device 100 by external devices using wireless or cabled connections. The storage 114 can be accessed by, for example, by a remote utility, meter reader, and/or consumer.

The computing device 100 includes switch 134, which can be arranged in a separate assembly from (or the same assembly of) the meter 110. Switch 134 is arranged to select particular transducers of transmit/receive (TX/RX) network 136. The various transducers of the transmit/receive network 136 are associated with individual channels. The (e.g., pair of) transducers of each selected channel are arranged to transmit an ultrasonic signal into a channel and to receive a signal in response to a transmission of the transmitted ultrasonic signal. Switch 134 is arranged to select a channel (for example) in response to a control signal from data acquisition system 111. Accordingly, switch 134 is arranged to selectively couple the transducers of variously selected individual channels to the data acquisition signals to monitor usage of a selected channel.

The monitored usage can be used for proportional billing, for example. The data acquisition system 111 is arranged to convert responses received from selected transducers to a data sample. The data sample can be used to provide a data point that represents channel flow at a point in time. The data samples can be accumulated (e.g., repeatedly) over a billing period such that the accumulated data samples can be used to accurately determine various selected channel flows over the billing period. Accurately determining a selected channel flow can include, for example, determining a total water flow for a selected channel flow that is substantially equal to the actual water consumption of the selected channel. A substantially equal amount of water consumption is an amount for which an actual billing rate results in a negligible cost difference between the estimated and the actual amount. Accordingly, billing for a particular channel can include amounts that are (at least in part) proportional to the actual consumption of the particular channel.

The data acquisition system 111 can use processing resources (such as CPU 112) in order to derive quantity (and/or quality) metrics such as the total flow, maximum rate, minimum rate (which can be indicative of a wasteful leak, for example), time-of-day usage (for different billing rates), and the like. As population densities increase, conservation and accurate billing become more important (especially as the number of such household subunits in apartment complexes and/or apartment buildings could range from ten to even more than 100 in each such building). (The term "apartment" can mean, for example, one or more buildings that contain multiple subunits, a single subunit of an "apartment," and/or a complex of individual buildings each having one or more dwelling units.)

In some developing areas, municipalities (and other government entities) and utilities are not able to provide sufficient water supplies to meet the increasing demand. On occasion, consumers and/or Residents Associations (RAs) have developed alternate supplies (such as by digging tube wells or purchasing tankers of water). In such cases, accurate water metering is increasingly important in monitoring consumption of each individual household (e.g., consumer entity) as water becomes a scarcer resource that the public utility system is often unable to support. Where a consumer-run collective organization (such as an RA) manages water supplies in a developing area, cost concerns are magnified and often even small amounts of money play a decisive role in the ability of the consumer-run collective organization to supply or even monitor the consumption of each household unit. The problem is magnified in the costs associated with upgrading and retrofitting "ad hoc" water systems that are not uniform or designed with convenient access to permit individual metering system.

A single multi-channel water meter disclosed herein is arranged to monitor multiple water channels (e.g., pipes, each of which feed an individual subunit household in an apartment). Each individual water channel includes one or more ultrasound sensors. The sensors can be "non-intrusive" (e.g., affixed to the outside of a conduit of the channel to be measured) or "intrusive" (e.g., affixed to the conduit such that a portion of the sensor extends into the channel stream to be measured).

The single multi-channel water meter is arranged individually monitor the one or more water channels and to convert, store, and transmit the readings to a central database. Using common electronics components allows the cost of sophisticated components to be shared across the multi channels. For an example embodiment having ten channels, a multi-channel water meter system that is estimated to cost $50 accordingly has a per-channel cost as low as five dollars.

A single multi-channel water meter system as disclosed herein can be provided as a retrofit kit having a single multi-channel water meter having digital and analog components. The digital components are adapted for mounting closely to water channels to be monitored (e.g., spaced less than around six inches apart). The analog components include drivers, receivers, converters, and transducers that are adapted to be coupled with the single multi-channel water meter via a switch. In various embodiments, the analog components can be situated with (or within) a single chassis of a multi-channel water meter or can be positioned (electrically) between the transducers and the single multi-channel water meter. In various embodiments, the components can be cabled together to permit wired communications amongst the components.

Figure 2:
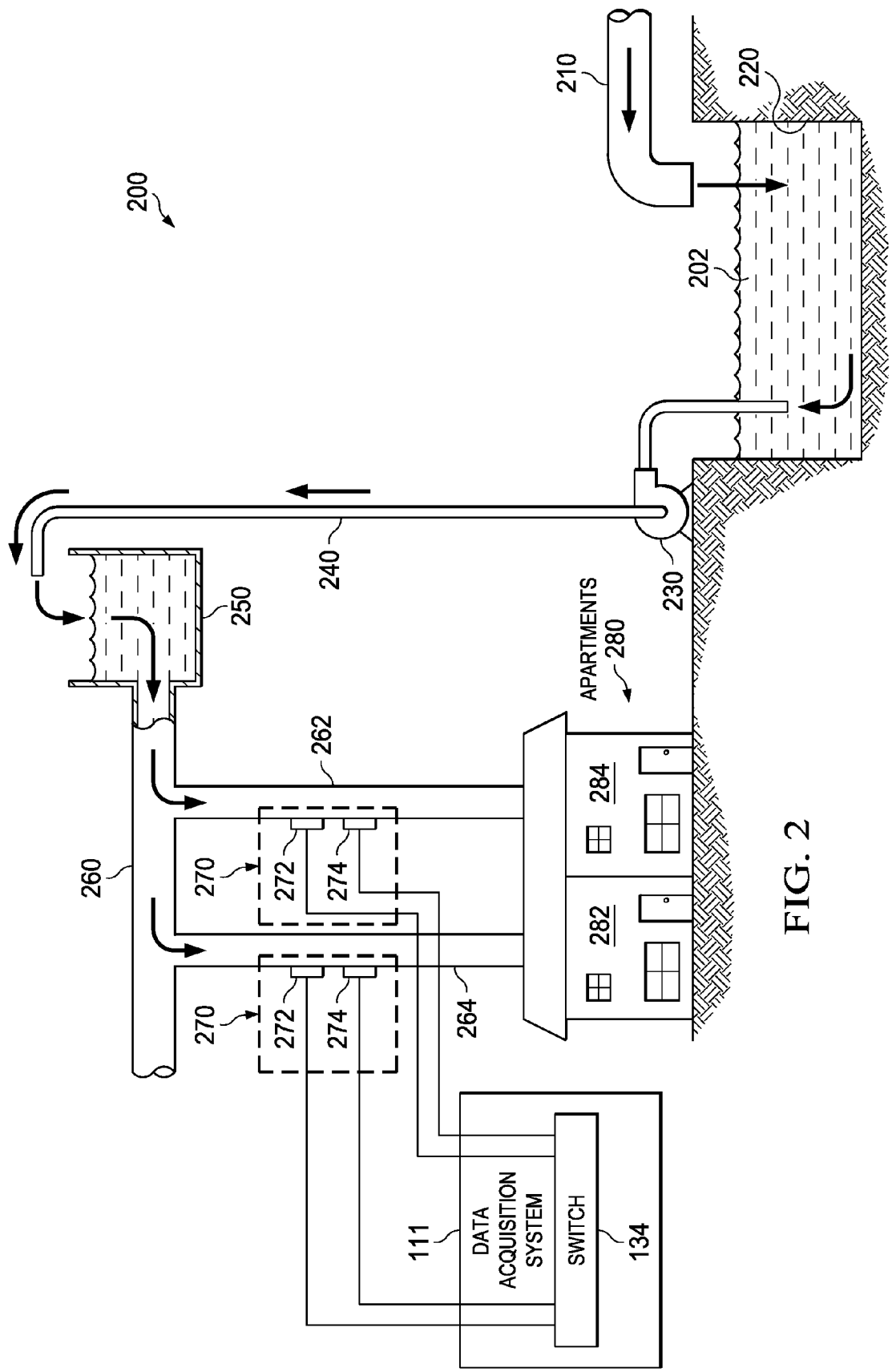
FIG. 2 is a schematic diagram illustrating a measurement system for performing water consumption measurements in accordance with example embodiments of the disclosure.

FIG. 2 is a schematic diagram illustrating a measurement system for performing water consumption measurements in accordance with example embodiments of the disclosure. Generally described, the water distribution system 200 includes a data acquisition system 111 as a subsystem that is used to measure individual channels of the water distribution system 200 for individual occupants (e.g., that are typically responsible for paying utility bills associated with a single subunit of an apartment).

The water distribution system 200 can include a water main 210, which is feed channel that is arranged to provide water from a water source (for example, such as provided by a utility, cistern, lake, or other body of water). The measurement of various feed channels is described below, for example, with reference to FIG. 6.

Although the water main 210 is illustrated schematically as a pipe, the water main 210 in various implementations can be any conveyance or conduit that is suitable for carrying substantial quantities of water. (A substantial quantity of water is, for example, a quantity of water that is sufficient to provide the average needs of one or more occupants.)

The water main 210 is arranged to provide water 202 to be stored in sump 220 as a volume of water. Sump 220 can be, for example, any container or enclosure that is suitable for storing sufficient water to provide for the average needs of the one or more occupants supplied from the sump 220.

Pump 230 is arranged to draw water from sump 220 and to substantially fill reservoir 250. (Substantially filling reservoir 250 is, for example, can be accomplished by raising the volume of water in the reservoir 250 to a degree that is sufficient to provide for the expected combined instantaneous needs of the one or more consumer entities.) As described below with reference to FIG. 6, reservoir 250 can be used to store water from various sources. Reservoir 250 is arranged, for example, in an elevated location to provide gravity-fed water (which lowers cost) to each occupant (e.g., individual consumer entity 282 and individual consumer entity 284) associated with apartments 280. Collective water main 260 is arranged to receive water stored in reservoir 250. In various embodiments, reservoir 250 can be pressurized to ensure and/or assist water flow from the reservoir 250 to each consumer entity (282 or 284) within apartments 280.

Collective water main 260 is a common conduit that is arranged to distribute water to each consumer entity via channels that branch out to a respective consumer entity. For example, the consumer entity 282 is coupled to the collective water main 260 via channel 264, and the consumer entity 284 is coupled to the collective water main 260 via channel 262. Not all consumer entities are shown for purpose of clarity of illustration.

Each channel includes a sensor 270 that is coupled to a respective channel and is arranged to measure the current flow through the respective coupled-to channel. For example, channel 262 and a channel 264 each include a sensor 270 that is individually coupled to each channel. Each sensor 270 includes, for example, a pair of transducers such as transducer 272 and transducer 274. As described below, the first transducer can be used to generate an ultrasonic signal that is transmitted through a channel (such as channel 262) and received on the second transducer coupled to the same channel. The transducers 272 and 274 can be mounted, for example, on a same side of the pipe or on the pipe at any location around the perimeter of a cross-section of the pipe (such as on opposite sides at a convenient angle) to each other to measure the channel flow.

Each sensor 270 is coupled to the switch 134 of the acquisition system 111. The acquisition system 111 is arranged, for example, to measure current flow through selected channels at various time intervals by using switch 134 to activate (and deactivate) a sensor that is associated with the particular channel. As described below, the data acquisition system 111 includes common components to provide a cost-effective solution for measurement of current flow in the selected channels.

Figure 3:
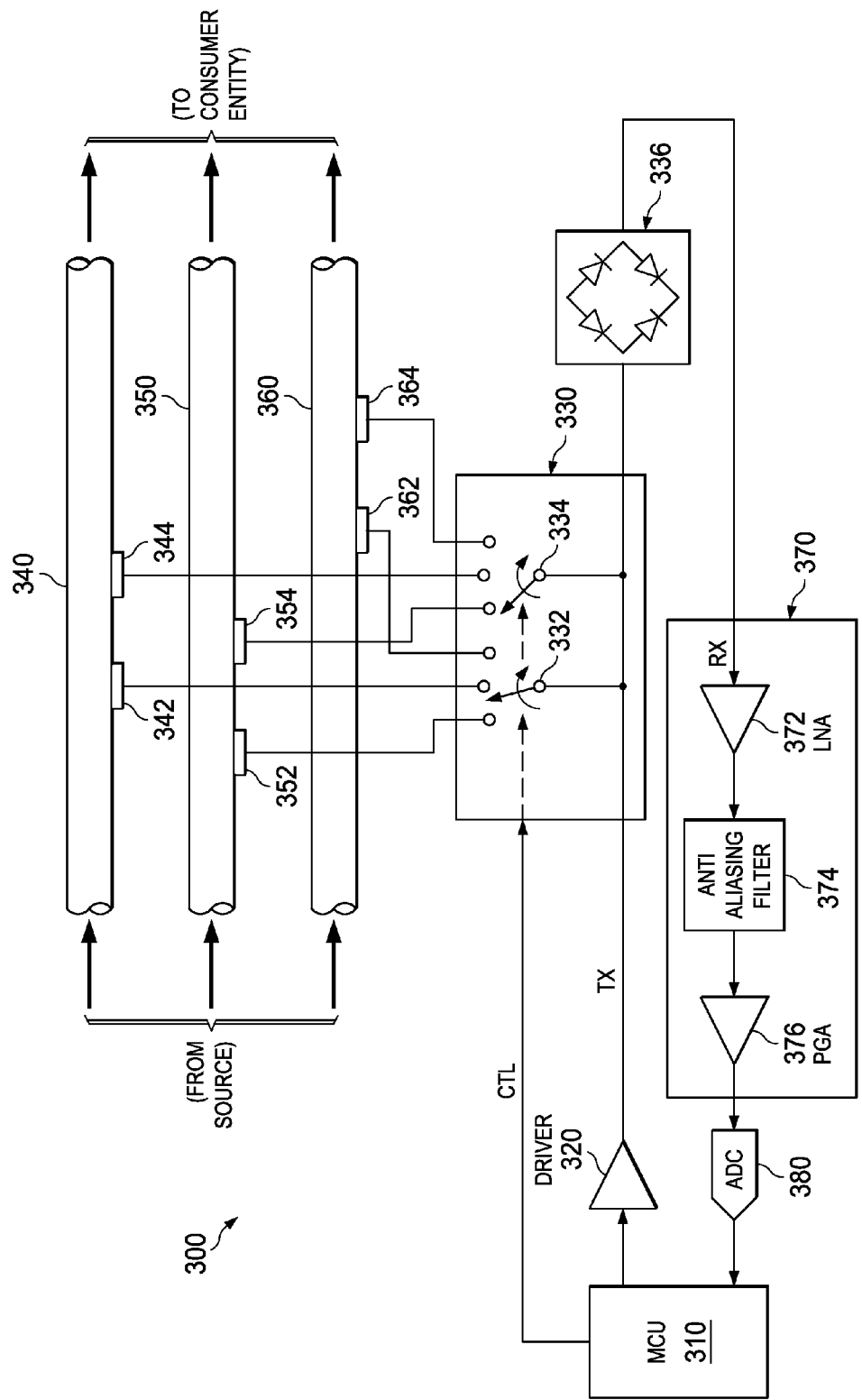
FIG. 3 is a schematic diagram that illustrates a time-multiplexed measurement system for performing water consumption measurements in accordance with example embodiments of the disclosure.

FIG. 3 is a schematic diagram that illustrates a time-multiplexed measurement system for performing water consumption measurements in accordance with example embodiments of the disclosure. Time-multiplexed measurement system 300 includes a micro-control unit (MCU) 310 that is arranged to generate a stimulus signal such as transmit (TX) signal via driver 320. Signal TX is coupled to pole 332 of switch 330. (Switch 330 is a switch such as switch 134.) Pole 332 is arranged to couple signal TX to any transducer (such as any of the transducers 342 and 344 of channel 340, the transducers 352 and 354 of channel 350, and the transducers 362 and 364 of channel 360) in response to the control (CTL) signal generated by MCU 310.

Accordingly, the flow in each channel can be measured by (1) coupling signal TX to a first transducer associated with each channel and by (2) coupling a receive (RX) signal that is generated by a second transducer (that is different from or the same as the first transducer) of each channel in response to the signal TX being transmitted through the associated channel. Pole 334 is arranged to couple any transducer (such as any of the transducers 342 and 344 of channel 340, the transducers 352 and 354 of channel 350, and the transducers 362 and 364 of channel 360) to the input of receiver 370 in response to the control (CTL) signal generated by MCU 310.

In a first example, MCU 310 asserts the control signal CTL such that pole 332 is coupled with transducer 342 and pole 334 is coupled with transducer 344. In this example, the speed of the flowing transmission medium (e.g., water flowing from a source to consumer entity) in channel 340 can be determined by evaluating characteristics of a signal propagated from transducer 342 through the flowing medium to transducer 344. For example, the speed of the flowing medium can be determined in accordance with a Doppler shift (or, e.g., a determination of the time-of-flight of the signal) of the propagated signal that is induced upon the propagated signal by the speed of the flowing medium.

In a second example, MCU 310 asserts the control signal CTL such that pole 332 is coupled to transducer 344 and pole 334 is coupled with transducer 342, which induces, for example, a Doppler shift having an opposite direction of the direction of the first example (or results in a time-of-flight of the signal, which, e.g., is the propagation time from one transducer to another transducer). A comparison of the Doppler shifts (or the time-of-flight of the signal) can be used to assess the quality of the evaluation of the measurements of the first and second examples.

In other examples, other channels can be measured by selecting first and/or second transducers of each respective channel. Accordingly, signal TX can be coupled to any transducer and signal RX can be received from any transducer. Transmit/receive (T/R) switch 336 is arranged, for example, to receive the signal RX and to protect sensitive components in receiver 370 (as described below with respect to FIG. 4).

Signal TX is typically generated as (relatively) high voltage pulses that are converted by the transducer to mechanical energy for generating an acoustic waveform that is transmitted through a (e.g., non-homogenous) transmission media (such as a pipe of a water channel). Dispersed ultrasonic waves are reflected by discontinuities in the medium and portions of the dispersed ultrasonic waves are received by the transducer as, for example, echoed signals. Thus, the transducer is a duplex device having components that both generate high voltage signals and receive low voltage signals. Amongst the components, the amplifiers that are arranged to amplify the relative low voltage signals returned from the transducer are protected by T/R switch 336 (which is a switch that includes, for example, a diode bridge 440 discussed below) from the relatively high voltage of the signal used to actively drive the transducer. Accordingly the T/R switch 336 is arranged to block high voltage signals while maintaining information from the received low voltage signals.

Receiver 370 is arranged to receive the signal RX. Low noise amplifier (LNA) 372 of receiver 370 is an amplifier having a high signal-to-noise ratio that is arranged to amplify the signal RX without introducing a substantial amount of noise in the amplified signal. (A substantial amount of noise is, for example, an amount of noise sufficient to cause an error in measurement where the measurement error causes an incorrect amount being billed to a consumer entity.) The output of LNA 372 is coupled to the input of the anti-aliasing filter 374.

The anti-aliasing filter 374 is arranged to low-pass filter the aliasing frequencies received from signal RX. The output of the anti-aliasing filter 374 is coupled to the input of programmable gain amplifier (PGA) 376. PGA 376 is arranged to scale the input of analog-to-digital converter (ADC) 380, for example, to enhance the resolution of the measurements made by ADC 380. The ADC 380 and the scaling factor of PGA 376 are controlled, for example, by MCU 310.

The MCU 310 is also arranged to receive samples from the output of the ADC 380 and determine flow rates of the measured channels as discussed above. The MCU 310 can perform real-time processing of the monitored data and/or transmit samples (e.g., to a central data processing system) for off-loaded processing (e.g., when utility-supplied current becomes unavailable).

The flow rates can be used to determine a volume of supplied water to a channel by integrating (e.g., over time) the measured flow rates in accordance with instantaneous current expected in the pipe of a channel (having a known diameter), for example. For example, a feeder channel from a common water source can use pipe having a 4-inch diameter, whereas 0.74-inch diameter piping can be used for water channels that branch out from a common conduit such as the feeder channel, sump, and/or reservoir. Thus, the dimensions can be used to determine an indication of a flow rate using a pipe diameter that is associated with the selected channel being monitored.

The currents can be mathematically calculated (using DSP algorithms in MCU 310, for example) in accordance with Bernoulli's Equation by using determined (and/or estimated) associated parameters such as pipe materials, pipe surface friction, pipe diameters, and the like. Calculated results can be enhanced by empirically measuring (in a one-time calibration session during installation, for example) and comparing the calculated results with the empirical results and adjusting the calculation parameters accordingly.

In an embodiment, analog components (such as the drivers, switches, and receivers) for driving and reading the transducers are shared by (e.g., coupled to) an analog component group of one or more channels, and a single set of digital components (such as the MCU 310 and ADC 380) is shared by (e.g., coupled to) one or more analog component groups. Thus the more expensive components (such as the MCU 310 and ADC 380 and also the mechanical chassis and/or enclosures) typically need be instantiated once (the cost of which is shared by all channels), and the less expensive components (such as the drivers, switches, and receivers) can be replicated as needed for a group of analog components (the cost of which is shared by the channels using the common circuitry).

Figure 4:
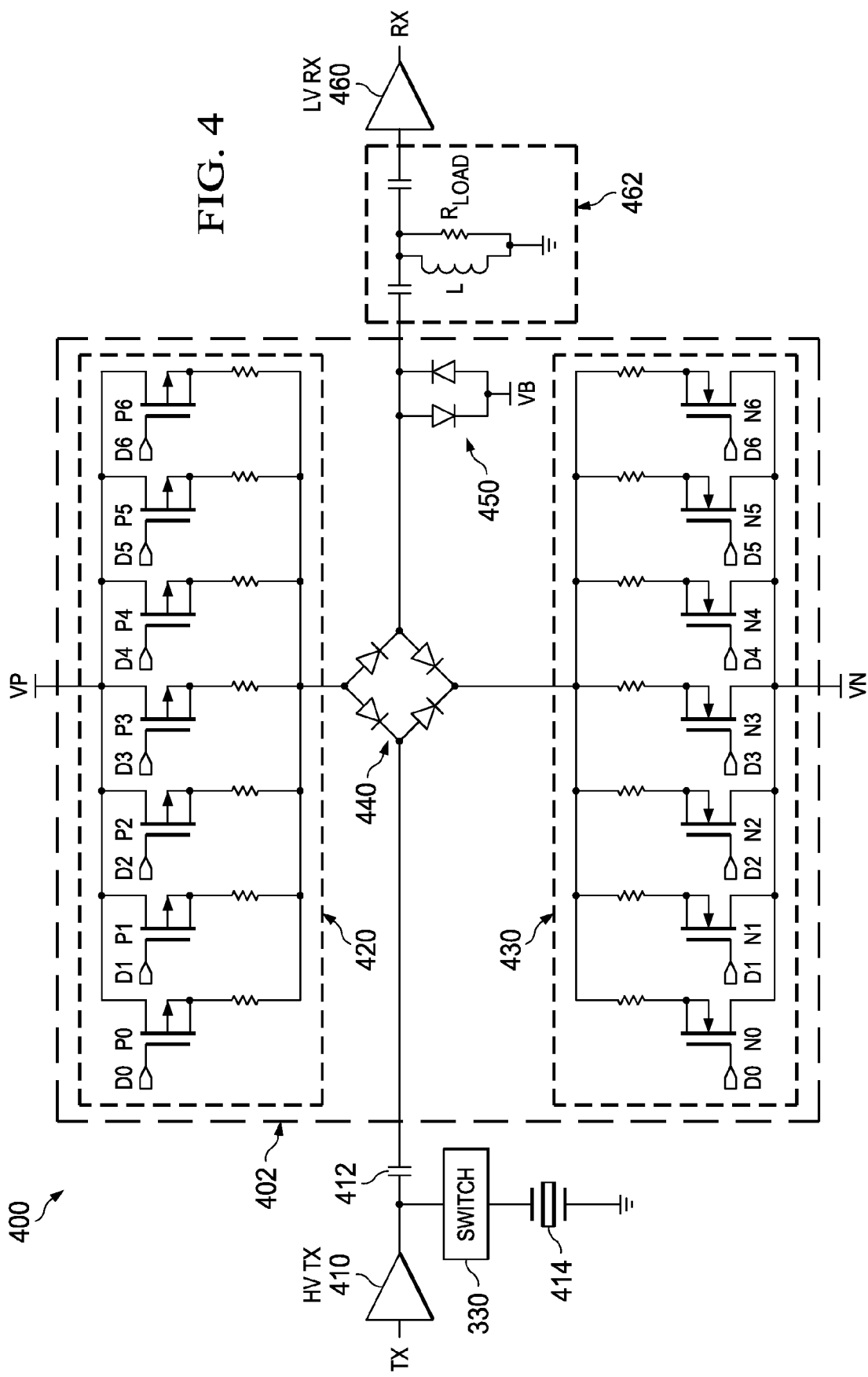
FIG. 4 is a schematic diagram that illustrates a transmit-receive switch of a time-multiplexed measurement system for performing water consumption measurements in accordance with example embodiments of the disclosure.

FIG. 4 is a schematic diagram that illustrates a transmit-receive switch of a time-multiplexed measurement system 400 for performing water consumption measurements in accordance with example embodiments of the disclosure. In general, the transmit/receive (T/R) switch 402 (which is an example T/R switch 336) is arranged to receive both the signal used to actively drive a transducer and the signal returned from a transducer and to protect sensitive components (e.g., for amplifying the signal returned from the transducer) from the relatively high voltage of the signal used to actively drive the transducer.

More particularly, the output of high voltage transmitter (HV TX) 410 is coupled to transducer 414 via switch 330. High voltage transmitter 410 is a driver such as driver 320. Switch 330 is arranged to couple selected transducers (as discussed above) to the T/R switch 402. Accordingly, high voltage transmitter 410 is arranged to drive the transducer 414 using the signal TX. Likewise, a response signal is received from a selected transducer (see FIG. 5, for example) which is coupled via capacitor 412 to an input of T/R switch 402.

The T/R switch 402 is a T/R switch such as provided by one channel of a Texas Instruments TX810 T/R switch integrated circuit. (In various embodiments, more than one channel of a TX810 T/R switch can be used in a data acquisition system 111). During a transmit mode of the T/R switch 402, internal diodes limit the output voltage when (relatively) high voltage transmitter signals are applied to the input of a transducer. During a receive mode, the insertion loss of T/R switch 402 is minimized such that (relatively) low voltage signals are clearly received from a transducer.

The T/R switch 402 includes a diode bridge 440 that arranged to couple a bias current that is used to scale the magnitude of signals TX and RX. Diode bridge 440 is arranged to selectively couple the positive excursions of signal TX (high voltage or low voltage) to the low-side bias network 430 and to selectively couple the negative excursions of signal TX to the high-side bias network 420. Low-side bias network 430 includes NMOS (negative-type metal oxide semiconductor) transistors N0, N1, N2, N3, N4, N5, and N6. High-side bias network 420 includes PMOS (positive-type metal oxide semiconductor) transistors P0, P1, P2, P3, P4, P5, and P6. Terminals D0, D1, D2, D3, D4, D5, and D6 are arranged to respectively control transistors N0, N1, N2, N3, N4, N5, and N6 as well as to respectively control transistors P0, P1, P2, P3, P4, P5, and P6. Accordingly, terminals D0, D1, D2, D3, D4, D5, and D6 are coupled to control circuitry (such as MCU 310) to selectively vary (e.g., from 0 to 7 mA) the bias current coupled across diode bridge 440.

Diode bridge 440 and clamp diodes 450 include, for example, high-voltage Schottky diodes to achieve fast recovery times. Voltage clamp 450 is arranged to limit the output node of diode bridge 440 to a bias voltage VB of around (for example) two volts peak-to-peak.

Terminator 462 is coupled between the output node of diode bridge 440 and the input terminal of low voltage receiver (LV RX) 460. The low voltage receiver (LV RX) 460 is a receiver such as LNA 372. Terminator 462 is a high-pass filter that is arranged to improve overload recovery times and reduce reflections (which by reducing reflections, for example, increases the resolution of transducer imaging).

Figure 5:
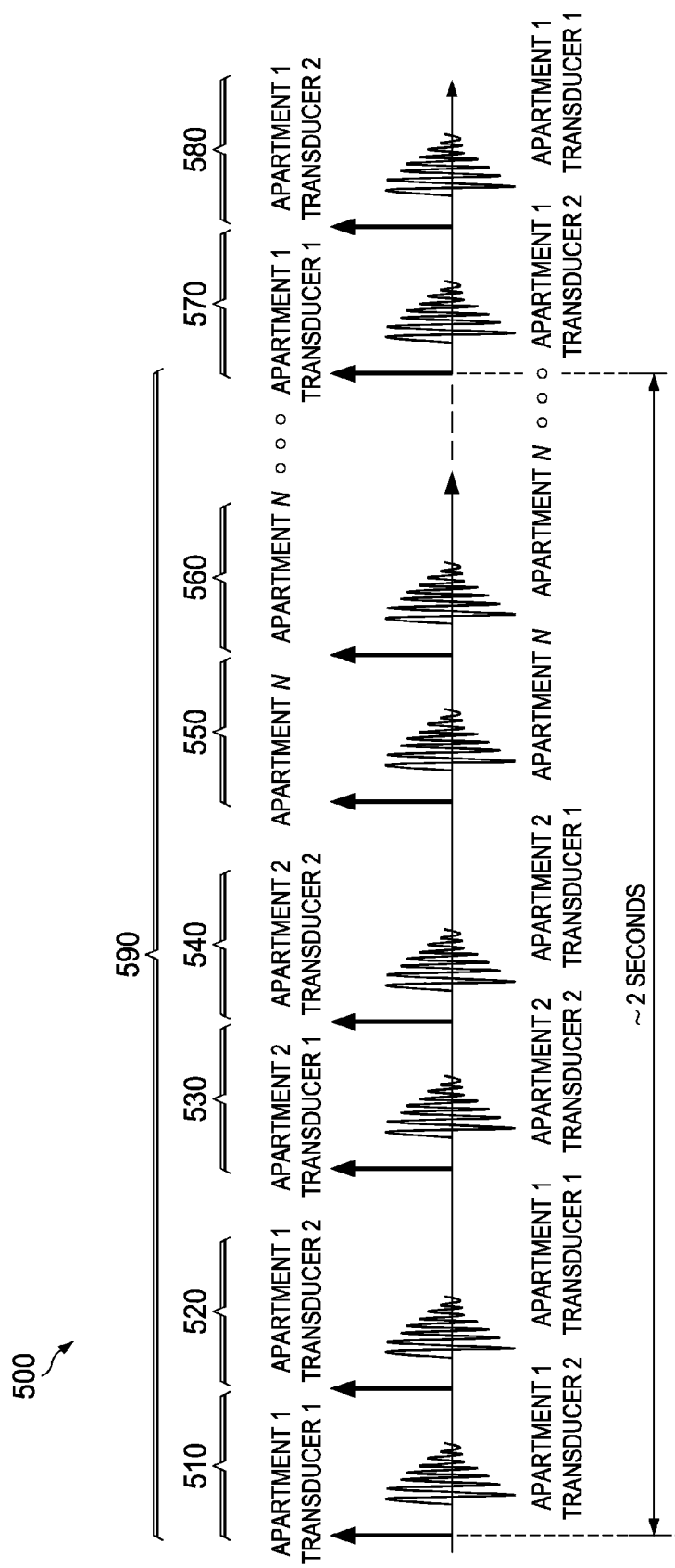
FIG. 5 is a timing diagram that illustrates a high-resolution pulse measurement in accordance with example embodiments of the disclosure.

FIG. 5 is a timing diagram that illustrates a high-resolution pulse measurement in accordance with example embodiments of the disclosure. Timing diagram 500 includes time periods 510, 520, 530, 540, 550, 560, 570, 580, and 590. Over each time period that occurs during sampling iteration time period 590, each channel that is to be monitored is samples twice as now described.

Before and/or during an initial portion of time period 510, a switch (such as switch 330) is arranged to couple the output of a driver (such as driver 320) to a first transducer (such as transducer 342) arranged in a first location of a channel used to supply water for a first apartment (e.g., apartment 1). After the driver is coupled to the first transducer, the driver is arranged to provide a stimulus signal for causing the first transducer to emit (for example) a "ping" (such as an ultrasonic signal) for measuring the speed of the (potentially) flowing medium (e.g., water) being conducted by the first channel.

During an intermediate portion of time period 510, the switch is arranged to couple a second transducer (such as transducer 344, which can be the same as or different from the first transducer) to a receiver (such as receiver 370) that is arranged to receive a propagated portion of the ping emitted by the first transducer. The received propagated portion of the ping (received by the second transducer) is converted and stored for analysis.

Before and/or during an initial portion of time period 520, the switch is arranged to couple the output of the driver to the second transducer. When the second transducer is a transducer that is different from the first transducer, the second transducer is arranged in a second location of the first apartment supply channel that is offset (e.g., along the axis of travel of the medium within the channel) from the first location. After the driver is coupled to the second transducer (of the first channel), the driver is arranged to cause the second transducer to emit a ping for measuring the speed of the medium being conducted by first channel.

During an intermediate portion of time period 520, the switch is arranged to couple the first transducer to the receiver that is arranged to receive a propagated portion of the ping emitted by the second transducer. The received propagated portion of the ping (received by the first transducer) is converted and stored for analysis. (For example, the received first ping and the received second pings contain opposite Doppler shifts (or the time-of-flight of the signal) when the first and second transducers are in different locations.)

Before and/or during an initial portion of time period 530, the switch is arranged to couple the output of the driver to a first transducer (such as transducer 352) arranged in a first location of a second channel used to supply water for a second apartment (e.g., apartment 2). After the driver is coupled to the first transducer (of the second channel), the driver is arranged to provide a stimulus signal for causing the first transducer to emit (for example) an ultrasonic signal for measuring the speed of the potentially flowing medium being conducted by the second channel. During an intermediate portion of time period 530, the switch is arranged to couple a second transducer (such as transducer 354, which can be the same as or different from the first transducer) to a receiver that is arranged to receive a propagated portion of the ping emitted by the first transducer. The received propagated portion of the ping (received by the second transducer) is converted and stored for analysis.

Before and/or during an initial portion of time period 540, the switch is arranged to couple the output of the driver to the second transducer. When the second transducer is a transducer that is different from the first transducer, the second transducer is arranged in a second location of the second apartment supply channel that is offset from the first location. After the driver is coupled to the second transducer (of the second channel), the driver is arranged to cause the second transducer to emit a ping for measuring the speed of the medium being conducted by second channel. During an intermediate portion of time period 540, the switch is arranged to couple the first transducer to the receiver that is arranged to receive a propagated portion of the ping emitted by the second transducer. The received propagated portion of the ping (received by the first transducer) is converted and stored for analysis.

Before and/or during an initial portion of time period 550, the switch is arranged to couple the output of the driver to a first transducer (such as transducer 362) arranged in a first location of an "Nth" channel used to supply water for a second apartment (e.g., apartment N). After the driver is coupled to the first transducer (of channel N), the driver is arranged to provide a stimulus signal for causing the first transducer to emit (for example) an ultrasonic signal for measuring the speed of the potentially flowing medium being conducted by channel N. During an intermediate portion of time period 550, the switch is arranged to couple a second transducer (such as transducer 364, which can be the same as or different from the first transducer) to a receiver that is arranged to receive a propagated portion of the ping emitted by the first transducer. The received propagated portion of the ping (received by the second transducer) is converted and stored for analysis.

Before and/or during an initial portion of time period 560, the switch is arranged to couple the output of the driver to the second transducer. When the second transducer is a transducer that is different from the first transducer, the second transducer is arranged in a second location of the "Nth" apartment supply channel that is offset from the first location. After the driver is coupled to the second transducer (of the second channel), the driver is arranged to cause the second transducer to emit a ping for measuring the speed of the medium being conducted by channel N. During an intermediate portion of time period 560, the switch is arranged to couple the first transducer to the receiver that is arranged to receive a propagated portion of the ping emitted by the second transducer. The received propagated portion of the ping (received by the first transducer) is converted and stored for analysis.

As described above, sampling iteration time period 590 is the time period over which two samples for each channel that is to be monitored are taken. Sampling iteration time period 590 is selected to permit, for example, accurate extrapolation of the water flow for billing purposes. In an example embodiment, sampling iteration time period 590 has a duration of around two seconds or less. After a sampling iteration time period 590 has expired, a new sampling iteration time period 590 can be started in which new measurement for monitored channels are taken. Thus, monitoring can be maintained to permit constant monitoring over a billing period (such as a month) for example. At the start of the new sampling iteration time period 590, flow measurements of the first channel can be measured (again) over the time periods 570 and 580 (in similar fashion as described above with respect to time periods 510 and 520, respectively).

Figure 6:
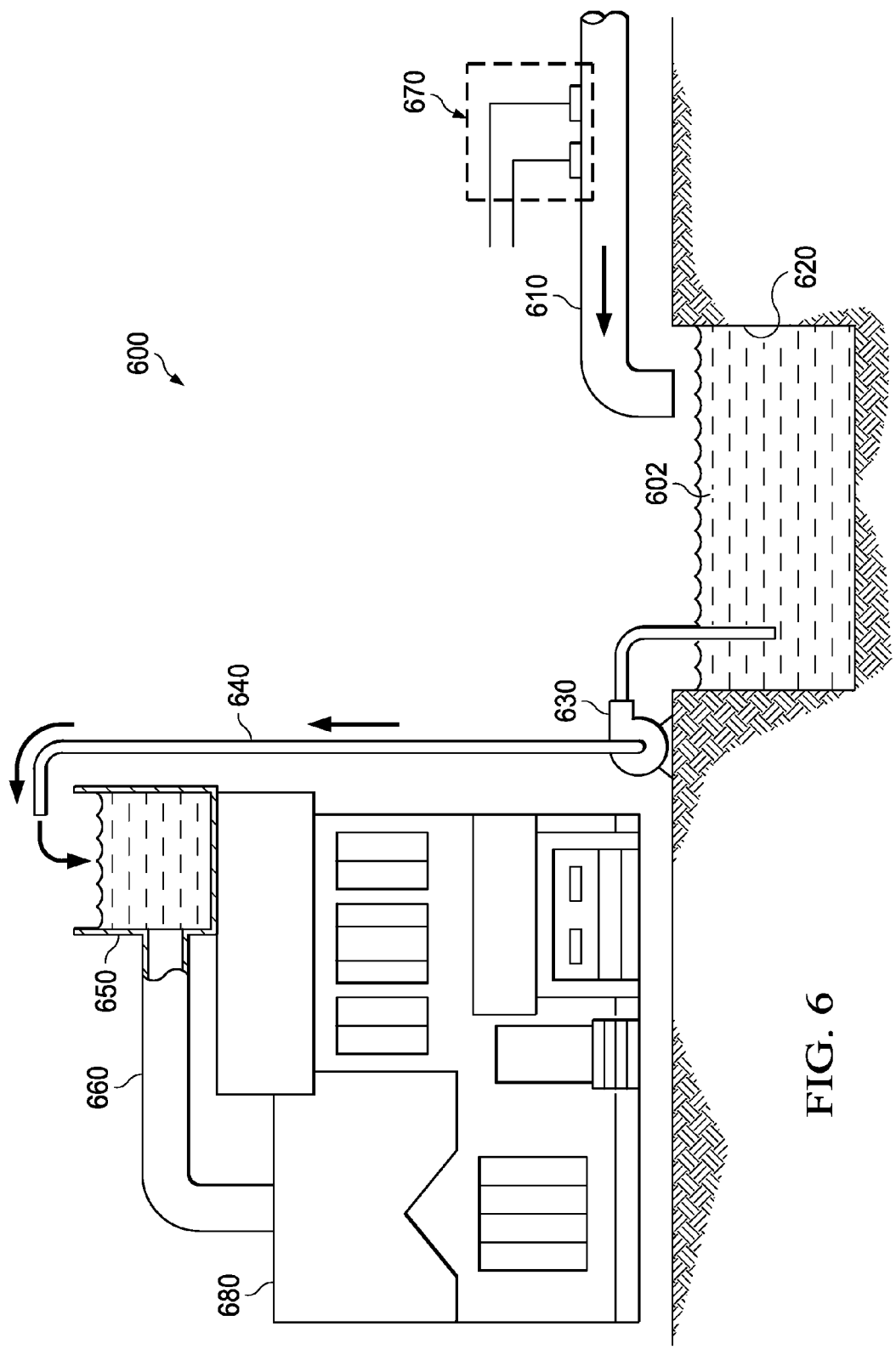
FIG. 6 is a block diagram illustrating a measurement system for performing water conveyance measurements in accordance with example embodiments of the disclosure.

FIG. 6 is a block diagram illustrating a measurement system for performing water conveyance measurements in accordance with example embodiments of the disclosure. In general, the water distribution system 600 includes a data acquisition system 111 as a subsystem. The water distribution system 600 can include a water main 610, which is arranged to provide water from a water source (for example, such as provided by a utility). Although the water main 610 is illustrated as a pipe, the water main 610 in various implementations can be any conveyance or conduit that is suitable for carrying substantial quantities of water. (A substantial quantity of water is, for example, a quantity of water that is sufficient to provide the average needs of one or more occupants.)

The water main 610 is arranged to provide a volume of water 602 to be stored in sump 620. Sump 620 can be, for example, any container or enclosure that is suitable for storing sufficient water to provide for the average needs of the one or more occupants of apartments supplied from the sump 620.

In an example application (in an area near Bangalore, India, for example), independent dwelling (such as a houses or villa) 680 have their own sump 620 (e.g., as an underground tank arranged to collect water from a utility provider such as a municipal corporation). Water main 610 is instrumented with sensor 670 and is coupled to a single multi-channel water meter that is arranged near the entry to the sump and is monitored by (for example) by a utility provider. In this example application, the water main 610 is expected to be used only for a few hours per day (or alternate days) to supply water to the sump 620 (and empty when not be used). Accordingly, the single multi-channel water meter is arranged to be activated in response to (or contemporaneously with) use of the water main 610. The single multi-channel water meter can be activated, for example, in response to a pressure sensor or a water main activation signal.

Additional (separately instrumented) separate water mains 610 can be arranged to supply feeder channels that provide water from different sources. For example, a water main 610 can be provided to supply water sourced from a lake, another water main 610 can be provided to supply water sourced from a utility, and another water main 610 can be provided to supply water sourced from an emergency water supply. Thus, the sump 620 (as well as pipes and reservoirs—such as reservoir 650—that are downstream from sump 620) is a common conduit into which water from various sources (e.g., feeder channels) flow.

Each of the water mains 610 can be separately instrumented such that, for example, the amount of water supplied from each source can be separately tracked. Separately tracking the amount of water supplied from each source, for example, allows consumers to be billed in accordance with by the amounts (and the cost rate differentials) of supplied from each source. For example, differing cost rates can be assigned to each source to more equitably bill for (and thus pay) each provider in accordance with actual costs of providing the water.

Pump 630 is arranged to draw water from sump 620 (using water from various sources) and to substantially fill reservoir 650. Reservoir 650 is arranged, for example, in an elevated location to provide gravity-fed water (which lowers cost) to each consumer entity (e.g., 682 and 684) associated with apartments 680. Collective water main 660 is arranged to receive water stored in reservoir 650. In various embodiments, reservoir 650 can be pressurized to ensure and/or assist water flow from the reservoir 650 to each consumer entity within apartments 680.

Water main 660 is arranged to provide water to a consumer entity 680. Water main 660 can be instrumented (e.g., with transducers) as described above, or not be instrumented. When the consumer entity 680 is the sole user of reservoir 650 and/or sump 620, consumer entity 680 can be billed (for example) using information collected using sensor(s) 670. When multiple consumer entities 680 exist, separate instrumented channels (such as channels 262 and channel 264 described above) can be used to permit apportioned billing.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A system for multi-channel flow sensing, the system comprising:
   control circuitry for generating at least one control signal to select at least one channel of which a flow rate is to be measured, wherein the selected channel is selected from a group of channels branching from a conduit;
   a driver for generating at least one stimulus signal;
   a receiver for receiving at least one response signal;
   a switch for coupling at least one sensor of the selected channel to the driver and the receiver in response to the control signal from the control circuitry, wherein the coupled sensor is for:
      propagating the stimulus signal from the driver through a flowing medium of the selected channel, and
      generating the response signal to the receiver in response to the propagated stimulus signal; and
   a converter for:
      periodically sampling the response signal from the receiver at a sampling rate that is sufficient to determine consumption of the flowing medium of the selected channel, and
   providing an indication of the periodic sampling to a processor for proportional billing in accordance with the indication.

2. The system of claim 1, wherein:
   the control circuitry is for generating at least first and second control signals to select at least first and second channels of which respective first and second flow rates are to be measured, wherein the selected first and second channels are selected from the group of channels branching from the conduit;
   the driver is for generating at least first and second stimulus signals;
   the receiver is for receiving at least first and second response signals;
   the switch is for coupling a first sensor of the selected first channel to the driver and the receiver in response to the first control signal from the control circuitry, wherein the coupled first sensor is for:
      propagating the first stimulus signal from the driver through the flowing medium of the selected first channel, and
      generating the first response signal to the receiver in response to the propagated first stimulus signal; and
   the switch is for coupling a second sensor of the selected second channel to the driver and the receiver in response to the second control signal from the control circuitry, wherein the coupled second sensor is for:
      propagating the second stimulus signal from the driver through the flowing medium of the selected second channel, and
      generating the second response signal to the receiver in response to the propagated second stimulus signal.

3. The system of claim 2, wherein the selected first channel is arranged to supply the flowing medium to a first dwelling from the conduit, and wherein the selected second channel is arranged to supply the flowing medium to a second dwelling from the conduit.

4. The system of claim 1, wherein the coupled sensor includes a first transducer and a second transducer in separate locations that are offset along an axis of travel of the flowing medium of the selected channel, wherein the coupled sensor is for propagating the stimulus signal from the driver via the first transducer through the flowing medium of the selected channel to the second transducer.

5. The system of claim 4, wherein the flow rate is to be measured by evaluating at least one of:
- a Doppler shift of the propagated stimulus signal via the first transducer through the flowing medium of the selected channel to the second transducer during a time period; and
- a time-of-flight of the propagated stimulus signal via the first transducer through the flowing medium of the selected channel to the second transducer during the time period.

6. The system of claim 5, wherein the coupled sensor is for propagating the stimulus signal from the driver via the second transducer through the flowing medium of the selected channel to the first transducer, wherein the time period is a first time period, and wherein the flow rate is to be measured by evaluating at least one of:
- a Doppler shift of the propagated stimulus signal via the second transducer through the flowing medium of the selected channel to the first transducer during a second time period; and
- a time-of-flight of the propagated stimulus signal via the second transducer through the flowing medium of the selected channel to the first transducer during the second time period.

7. The system of claim 6, wherein the converter is for periodically sampling the response signal from the receiver during a sampling iteration time period that includes the first and second time periods.

8. The system of claim 1, wherein the processor is for calculating an indication of the flow rate using at least one parameter associated with the selected channel, wherein the parameter includes at least one of: a material of the selected channel; a surface friction of the selected channel; and a diameter of the selected channel.

9. The system of claim 1, wherein the selected channel is arranged to supply the flowing medium to the conduit.

10. The system of claim 1, wherein the flowing medium of the selected channel is water.

11. A method of multi-channel flow sensing, the method comprising:
- generating at least one control signal to select at least one channel of which a flow rate is to be measured, wherein the selected channel is selected from a group of channels branching from a conduit;
- generating at least one stimulus signal from a driver;
- receiving at least one response signal with a receiver;
- with a switch, coupling at least one sensor of the selected channel to the driver and the receiver in response to the control signal;
- with the coupled sensor, propagating the stimulus signal from the driver through a flowing medium of the selected channel, and generating the response signal to the receiver in response to the propagated stimulus signal; and
- with a converter, periodically sampling the response signal from the receiver at a sampling rate that is sufficient to determine consumption of the flowing medium of the selected channel, and providing an indication of the periodic sampling to a processor for proportional billing in accordance with the indication.

12. The method of claim 11, wherein:
- generating at least one control signal includes generating at least first and second control signals to select at least first and second channels of which respective first and second flow rates are to be measured, wherein the selected first and second channels are selected from the group of channels branching from the conduit;
- generating at least one stimulus signal includes generating at least first and second stimulus signals;
- receiving at least one response signal includes receiving at least first and second response signals;
- a first sensor of the selected first channel is coupled by the switch to the driver and the receiver in response to the first control signal, and a second sensor of the selected second channel is coupled by the switch to the driver and the receiver in response to the second control signal;
- the first stimulus signal from the driver is propagated by the coupled first sensor through the flowing medium of the selected first channel, and the second stimulus signal from the driver is propagated by the coupled second sensor through the flowing medium of the selected second channel; and
- the first response signal is generated by the first sensor to the receiver in response to the propagated first stimulus signal, and the second response signal is generated by the second sensor to the receiver in response to the propagated second stimulus signal.

13. The method of claim 12, wherein the selected first channel is arranged to supply the flowing medium to a first dwelling from the conduit, and wherein the selected second channel is arranged to supply the flowing medium to a second dwelling from the conduit.

14. The method of claim 11, wherein the coupled sensor includes a first transducer and a second transducer in separate locations that are offset along an axis of travel of the flowing medium of the selected channel, wherein the stimulus signal from the driver is propagated by the coupled sensor via the first transducer through the flowing medium of the selected channel to the second transducer.

15. The method of claim 14, wherein the flow rate is to be measured by evaluating at least one of:
- a Doppler shift of the propagated stimulus signal via the first transducer through the flowing medium of the selected channel to the second transducer during a time period; and
- a time-of-flight of the propagated stimulus signal via the first transducer through the flowing medium of the selected channel to the second transducer during the time period.

16. The method of claim 15, wherein the stimulus signal from the driver is propagated by the coupled sensor via the second transducer through the flowing medium of the selected channel to the first transducer, wherein the time period is a first time period, and wherein the flow rate is to be measured by evaluating at least one of:
- a Doppler shift of the propagated stimulus signal via the second transducer through the flowing medium of the selected channel to the first transducer during a second time period; and
- a time-of-flight of the propagated stimulus signal via the second transducer through the flowing medium of the selected channel to the first transducer during the second time period.

17. The method of claim 16, wherein the response signal is periodically sampled from the receiver during a sampling iteration time period that includes the first and second time periods.

18. The method of claim 11, further including calculating by the processor an indication of the flow rate using at least one parameter associated with the selected channel, wherein the parameter includes at least one of: a material of the selected channel; a surface friction of the selected channel; and a diameter of the selected channel.

19. The method of claim 11, wherein the selected channel is arranged to supply the flowing medium to the conduit.

20. The method of claim 11, wherein the flowing medium of the selected channel is water.

* * * * *